United States Patent
Hu et al.

(10) Patent No.: US 9,971,806 B2
(45) Date of Patent: May 15, 2018

(54) SUPPORTING IMPERATIVE GRAPHIC QUERIES ON A RELATIONAL DATABASE

(71) Applicant: International Business Machines Corporation, Armonk, NY (US)

(72) Inventors: Gang Hu, Beijing (CN); Jing Mei, Beijing (CN); Weijia Shen, Beijing (CN); Wen Sun, Beijing (CN); Guo Tong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 14/720,034

(22) Filed: May 22, 2015

(65) Prior Publication Data

US 2015/0379082 A1    Dec. 31, 2015

(30) Foreign Application Priority Data

Jun. 25, 2014  (CN) .......................... 2014 1 0294924

(51) Int. Cl.
    G06F 17/30    (2006.01)
(52) U.S. Cl.
    CPC .. *G06F 17/30469* (2013.01); *G06F 17/30327* (2013.01); *G06F 17/30427* (2013.01)
(58) Field of Classification Search
    None
    See application file for complete search history.

(56) References Cited

U.S. PATENT DOCUMENTS

| 8,285,708 | B2 | 10/2012 | Bowers et al. |
| 8,671,091 | B2 | 3/2014 | Cherniack et al. |
| 8,694,561 | B2 | 4/2014 | Peukert |
| 2005/0166181 | A1* | 7/2005 | Grieskamp ............... G06F 8/31 717/114 |
| 2008/0222087 | A1* | 9/2008 | Balmin ............ G06F 17/30935 |
| 2012/0130988 | A1* | 5/2012 | Nica ................. G06F 17/30463 707/718 |
| 2014/0019490 | A1 | 1/2014 | Roy et al. |
| 2014/0039952 | A1 | 2/2014 | Nesamoney et al. |
| 2014/0067781 | A1 | 3/2014 | Wolchok et al. |
| 2014/0067793 | A1 | 3/2014 | Shironoshita |
| 2014/0075161 | A1* | 3/2014 | Zhang ..................... G06F 8/453 712/220 |
| 2014/0244687 | A1* | 8/2014 | Shmueli ........... G06F 17/30587 707/780 |

(Continued)

OTHER PUBLICATIONS

De Virgilio et al., "Converting Relational to Graph Databases," GRADES '13: First International Workshop on Graph Data Management Experiences and Systems, Jun. 2013, pp. 1-6, New York, Copyright 2013 ACM.

(Continued)

*Primary Examiner* — Anh Tai Tran
(74) *Attorney, Agent, or Firm* — Laura E. Gisler

(57) ABSTRACT

It is provided a method and system for supporting imperative graphic queries on a relational database, the method comprising: parsing an imperative graphic query into operations of execution plans; translating operations of execution plans which are supported by the relational database into common table expression queries; and executing the translated common table expression queries on the relational database.

16 Claims, 15 Drawing Sheets

(56) References Cited

U.S. PATENT DOCUMENTS

2015/0220597 A1* 8/2015 Simhadri .......... G06F 17/30448
707/797

OTHER PUBLICATIONS

Holzschuher et al., "Performance of Graph Query Languages: Comparison of Cypher, Gremlin and Native Access in Neo4j," EDBT '13: Proceedings of the Joint EDBT/ICDT 2013 Workshops, Mar. 2013, pp. 1-10, Italy, Copyright 2013 ACM.
CN Application 201410294924.7, entitled "Supporting Imperative Graphic Queries on a Relational Database," filed Jun. 25, 2014.

* cited by examiner

* SP translator converts loop queries into stored procedure calls, with the translated SQL fragments as SP parameters.

SUPPORTING IMPERATIVE GRAPHIC QUERIES ON A RELATIONAL DATABASE

CROSS REFERENCE TO RELATED APPLICATIONS

This application claims priority to Chinese Patent Application No. 201410294924.7, filed Jun. 25, 2014, which is incorporated herein in its entirety.

BACKGROUND

The present disclosure relates to a database technology, and more particularly, to a method and system for supporting imperative graphic queries on a relational database.

With increasing demands for storing and querying graphic structural data, graphic database and graphic query language are developed increasingly, some of which are already widely applied in industry, especially a graphic database of so called Not Only Structured Query Language (NoSQL) family, such as Neo4J™ (Owned by Neo Technology), Infinite Graph® (Owned by Objectivity Inc.), DEX® (Owned by Sparsity Technologies), InfoGrid, and HyperGraphDB. There are two basic graphic query languages in the graphic database: imperative queries (such as Gremlin language, and JRuby language and so on) and declarative queries (such as Cypher, Simple Protocol and RDF Query Language (SPARQL), simple protocol and RDF query language and so on).

The relational database is based on a relational model on a basis of two-dimensional table structure, which has been widely used for a very long time, and developed very well. The current mainstream relational databases may include ORACLE® (Owned by Oracle International Corporation), DB2® (Owned by International Business Machines Corporation), SQLSERVER, SYBASE® (Owned by Sybase Inc.), MYSQL, and so on. However, how to utilize the relational database to efficiently manage and inquiry graphic data, especially how to support imperative queries of graphic database on the relational database, is still an unsolved problem.

Traditional technology only integrates declarative queries (for example Structured Query Language (SQL)) into imperative queries (for example, Java Data Base Connectivity (JDBC)), or only supports declarative queries (for example Cypher, SPARQL and so on). The former method normally causes converting one graphic query into too many primitive queries (for example, JAVA® (Owned by Oracle America, Inc.) codes with JDBC), which greatly degrades query performance. The latter method also causes an inferior expression.

Thus, a technology for supporting imperative graphic queries on a relational database is needed.

SUMMARY

According to an aspect of the present disclosure, it is provided a method for supporting imperative graphic queries on a relational database, comprising: parsing an imperative graphic query into operations of execution plans; translating operations of execution plans which are supported by the relational database into common table expression queries; and executing the translated common table expression queries on the relational database.

According to another aspect of the present disclosure, it is provided a system for supporting imperative graphic queries on a relational database, comprising: means configured to parse an imperative graphic query into operations of execution plans; means configured to translate operations of execution plans which are supported by the relational database into common table expression queries; and means configured to execute the translated common table expression queries on the relational database.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Preferred embodiments of the present disclosure are described in details with reference to drawings. Although the drawings show the preferred embodiments of the present disclosure, it should be understood that the present disclosure can be implemented in various forms and should not be limited by the embodiments described herein. On the contrary, those embodiments are provided for the thorough and complete understanding of the present disclosure, and completely conveying the scope of the present disclosure to those skilled in the art.

Figure 1:
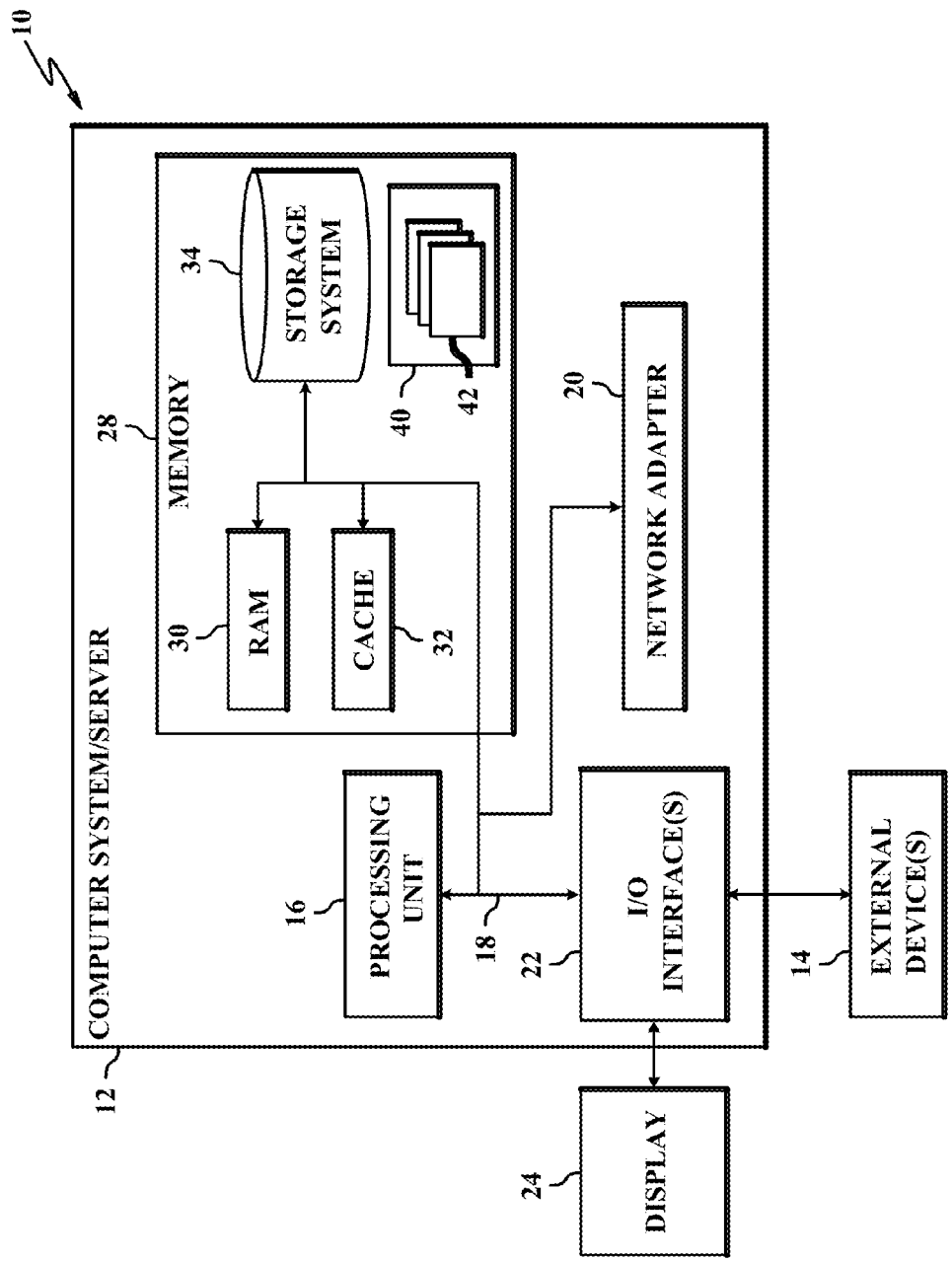
FIG. 1 shows an exemplary computer system/server 12 which is applicable to implement the embodiments of the present invention.

FIG. 1 shows an exemplary computer system/server 12 which is applicable to implement the embodiments of the present invention. Computer system/server 12 as shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12, including, but are not limited to: microcode, device drivers, redundant processing units, external disk drive arrays, RAID systems, tape drives, and data archival storage systems, etc.

Figure 2:
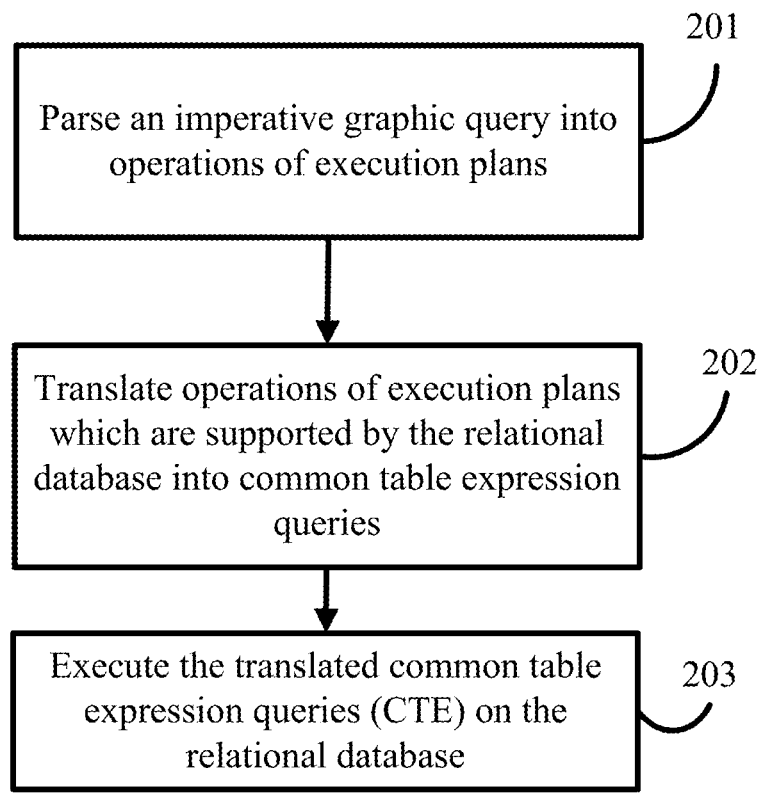
FIG. 2 shows an example flowchart of a method for supporting imperative graphic queries on a relational database according to an embodiment of the present invention.

Now refer to FIG. 2, which shows an example flowchart of a method 200 for supporting imperative graphic queries on a relational database, according to an embodiment of the present invention.

The method 200 for supporting imperative graphic queries on a relational database as shown in FIG. 2 includes: step 201, parsing an imperative graphic query into operations of execution plans; step 202, translating operations of execution plans which are supported by the relational database into common table expression queries; and step 203, executing the translated common table expression queries (CTE) on the relational database.

As such, compared to traditionally breaking down directly an imperative graphic query into a number of primitive operations which can be executed on a relational database, this embodiment translates the imperative graphic query which is supported by the graphic database by utilizing common table expressions (CTEs) which can be executed on the relational database, so that it is possible to use the imperative graphic query which is supported by the graphic database on the relational database to perform query with substantially same function and to obtain a substantially same execution result, and meanwhile, the number of codes of the translated CTE is less than that of the primitive operations which are traditionally broken down (because one CTE can probably implement functions of a plurality of primitive operations), so the running speed for the queries can be faster.

Figure 3:
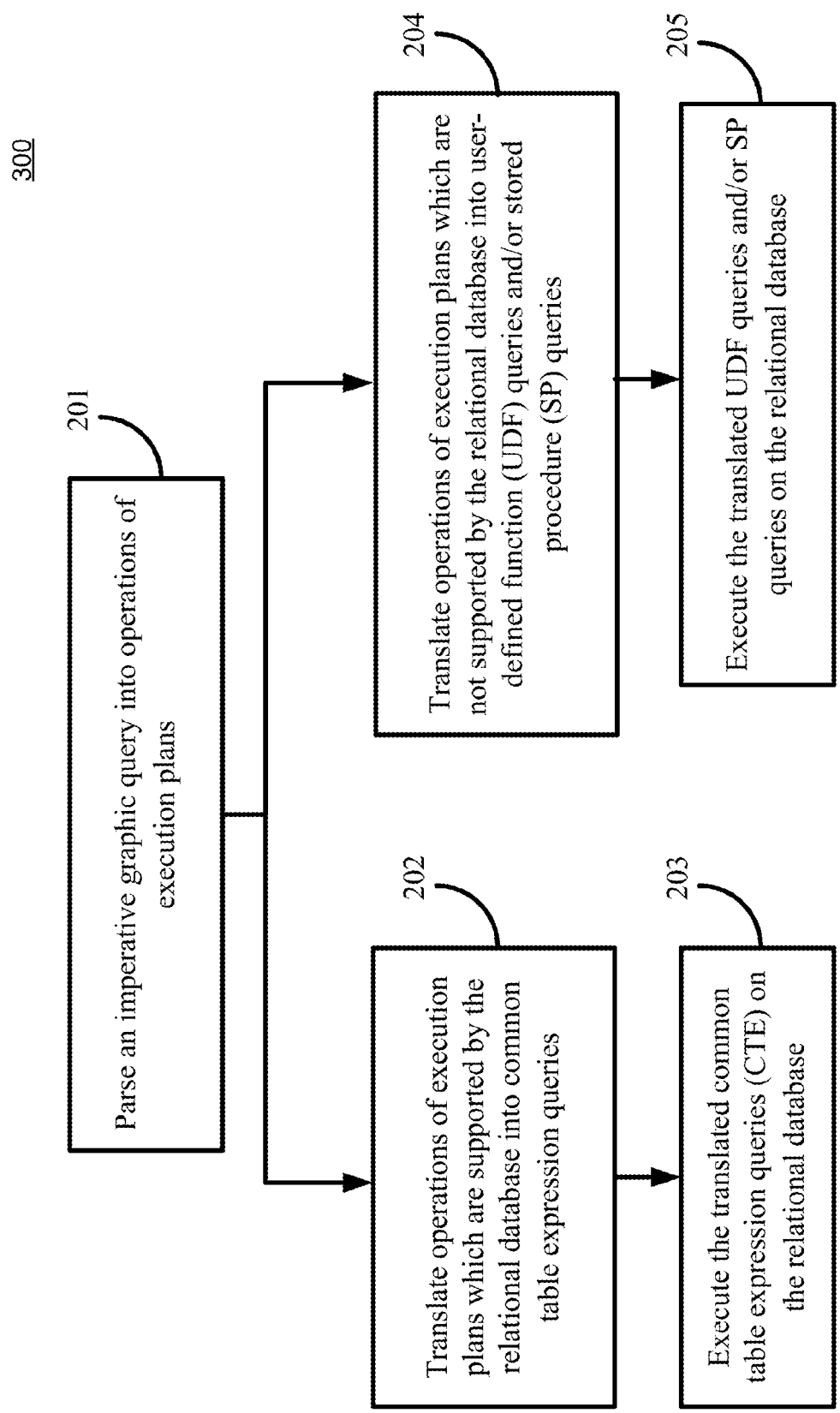
FIG. 3 shows an example flowchart of a method for supporting imperative graphic queries on a relational database according to another embodiment of the present invention.

FIG. 3 shows an example flowchart of a method 300 for supporting imperative graphic queries on a relational database according to another embodiment of the present invention.

As shown in FIG. 3, the method 300 includes: step 201, parsing an imperative graphic query into operations of execution plans; step 202, translating operations of execution plans which are supported by the relational database into common table expression queries; step 203, executing the translated common table expression queries (CTE) on the relational database; step 204, translating operations of execution plans which are not supported by the relational database into user-defined function (UDF) queries and/or stored procedure (SP) queries; and step 205, executing the translated UDF queries and/or SP queries on the relational database.

As such, in the case that the operations of execution plans parsed from the imperative graphic query cannot be directly supported by existing functions and query languages of the relational database, it is possible to use the UDF and/or SP which are also supported by the relational database to translate the operations of the execution plans, so that almost all the imperative graphic queries which are supported by the graphic database can be completely translated into query sentences supported by the relational database, while the number of the translated query sentences (including for example CTE, UDF, and/or SP sentences) is reduced and the running speed for the queries is faster.

In an embodiment, the method 200 may further include: further translating particular queries among the translated user-defined function queries into common table expression queries. Some UDF queries can be further translated into CTE queries, so that the running speed for the queries can be much faster.

In an embodiment, the method 200 may further include: further translating particular queries among the translated common table expression queries into stored procedure queries. In an embodiment, the method 204 may further include: further translating particular queries among the translated user-defined function queries into common table expression queries. As such, some UDF queries and/or CTE queries can be further translated into SP queries, so that the running speed for the queries can be much faster.

In the method 200 and the method 300 as shown in FIG. 2 and FIG. 3, in an embodiment, the method 200 may further include: in response to duplicate common table expression queries existing in the translated common table expression queries, combining the duplicate common table expression queries.

For example, there is a CTE query of querying one table to find A, while there is another CTE query of querying the same table to find B, then, the two CTE can be considered as being duplicate, and they can be combined to form one CTE query, that is, to query the table to find A and B one time.

In this embodiment, the duplicate CTE queries can be combined to reduce the number of the translated query sentences, so as to make the running speed for the queries much faster.

In an embodiment, the method 200 or 300 as shown in FIG. 2 or FIG. 3 may further include: based on the relational database, according to the translated queries, building a query tree; and according to estimated cost for each node of the query tree, reconstructing the query tree to reduce the total estimated cost.

In an embodiment, the query tree is a Left deep join tree, each connection father node having two child nodes in the left deep join tree indicates a connection operation between two relational data sets, each non-connection father node having only one child node and this child node indicate a selection or projection operation for one relational data set, the respective nodes of the left deep join tree are numbered in post order traversal, and the leftmost child node has the least number. The building of the query tree is a common technology in the present field, and constructing the query tree by a left deep join tree can relatively intuitively reflect the procedure of the queries.

In an embodiment, the step of according to estimated cost for each node of the query tree, reconstructing the query tree to reduce the total estimated cost may include: rewriting the connection order of the query tree to minimize the entire estimated cost. In particular, in another embodiment, a process is carried out on each connection father node sequentially in the number order with the connection father node with the least number as a start, wherein the process on one connection father node includes: estimating the cost for two child trees connected with the connection father node and the cost for obtaining the connection father node by connecting the two child trees; and determining whether the left child tree and the right child tree are exchangeable by: estimating the cost for the connection father node after exchanging the left and right child trees; and if the cost after exchanging the left and right child trees is reduced, then exchanging the left and right child trees to rewrite the connection order of the connection father node.

For example, if the two child trees connected with the connection father node represent scanning a table of all the people's identities (IDs) and scanning a table of names corresponding to IDs of all the people, all the animals, movies and so on respectively (in which the number of the items named Bob is 900, the number of the items named Bill is 800, and so on), and the costs for the two child trees are 80K (a total of 80K people) and 900 (900 items named Bob), respectively, and the cost of connecting the two child trees to query a person named Bob to get the connection father node is 80K (because, all the 80K people should be traversed to inquiry the person named Bob); however, if the two child trees are exchanged, i.e., to query which of all the items named Bob are people, and the cost for the query is reduced to 900, because only 900 items named Bob should be traversed to find whether they are people, and thus, after exchanging the two child trees, the cost for the query is reduced, so the two child trees can be exchanged, to rewrite the connection order of the connection father node.

In this embodiment the query tree constructed by the translated CTE, UDF and/or SP query sentences can be optimized to further optimize the translated CTE, UDF and/or SP query sentences, so that the entire query cost required for executing all the queries can be least (or at least less), so as to reduce the costs such as the time spent on performing these queries on the relational database as much as possible.

Normally, in the above examples, the estimated cost for each node may be the number of each data set obtained based on the statistics on the relational database. Of course, the estimated cost is not limited to this, and it may be other types of statistic data, such as time for the queries.

In an embodiment, the operations of the execution plans supported by the relational database may include one or more of: graph traversal operation and transformation, filtering, and branching operations of the graph traversal operation; and the operations of the execution plans not supported by the relational database include one or more of: path operation, cycle operation, recursive operation, and addition, deletion and alteration operations on graphic data.

In an embodiment, the imperative graphic query may be a typical Gremlin query.

As such, with the respective embodiments, it is possible to use the imperative graphic queries supported by the graphic database on the relational database to perform the query with a substantially same function and to obtain a substantially same execution result without directly breaking down the operations of the execution plans into a series of primitive operations of the relational database, and meanwhile, the running speed for the queries can be faster.

Figure 4:
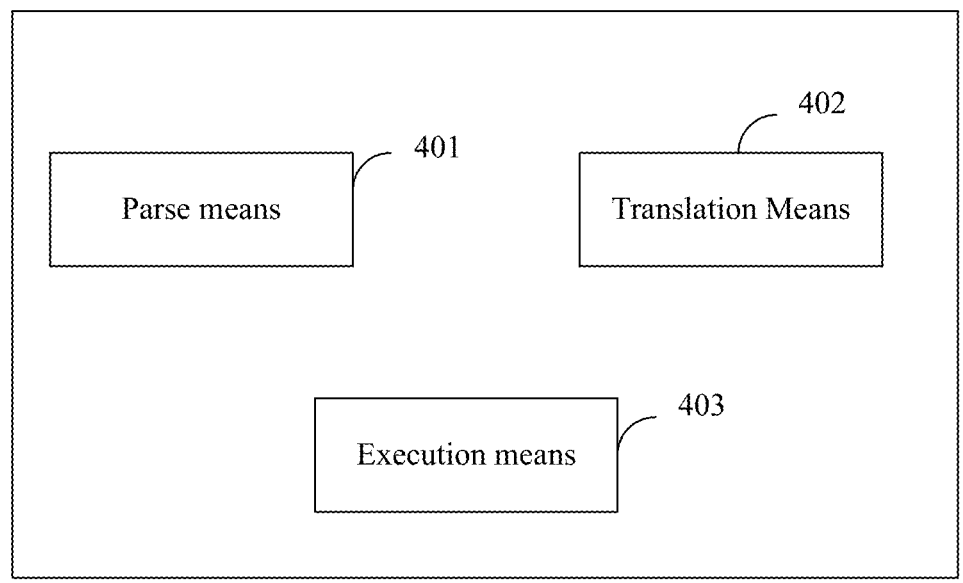
FIG. 4 shows an example block diagram of a system for supporting imperative graphic queries on a relational database according to a further embodiment of the present invention.

FIG. 4 shows an example block diagram of a system 400 for supporting imperative graphic queries on a relational database according to a further embodiment of the present invention.

The system 400 for supporting imperative graphic queries on a relational database as shown in FIG. 4 includes: a parse means 401 configured to parse an imperative graphic query into operations of execution plans; a translation means 402 configured to translate operations of execution plans which are supported by the relational database into common table expression queries; and an execution means 403 configured to execute the translated common table expression queries (CTE) on the relational database.

As such, compared to traditionally breaking down directly an imperative graphic query into a number of primitive operations which can be executed on a relational database, this embodiment translates the imperative graphic query which is supported by the graphic database by utilizing common table expressions (CTEs) which can be executed on the relational database, so that it is possible to use the imperative graphic query which is supported by the graphic database on the relational database to realize the substantially same execution plans, and meanwhile, the number of codes of the translated CTE is less than that of the primitive operations which are traditionally broken down (because one CTE can probably implement functions of a plurality of primitive operations), so the running speed for the query can be faster.

In an embodiment, the system 400 may further include: means configured to translate operations of execution plans which are not supported by the relational database into user-defined function queries; and means configured to execute the translated user-defined function queries on the relational database.

In an embodiment, the system 400 may further include: means configured to translate operations of execution plans which are not supported by the relational database into stored procedure queries; and means configured to execute the translated stored procedure queries on the relational database.

As such, in the case that the operations of execution plans parsed from the imperative graphic query cannot be directly supported by existing functions of the relational database, it is possible to use the UDF and/or SP which are also supported by the relational database to translate the operations of the execution plans, so that almost all the imperative graphic queries which are supported by the graphic database can be completely translated into query sentences supported by the relational database, while the number of the translated query sentences (including for example CTE, UDF, and/or SP sentences) is reduced and the running speed for the query is faster.

In an embodiment, the system 400 may further include: means configured to further translate particular queries among the translated user-defined function queries into common table expression queries. Some UDF queries can be further translated into CTE queries, so that the running speed for the query can be much faster.

In an embodiment, the system 400 may further include: means configured to further translate particular queries among the translated common table expression queries into stored procedure queries. In an embodiment, the system 400 may further include: means configured to further translate particular queries among the translated user-defined function queries into stored procedure queries. As such, some UDF queries or CTE queries can be further translated into SP queries, so that the running speed for the query can be much faster.

In an embodiment, the system 400 may further include means configured to in response to duplicate common table expression queries existing in the translated common table expression queries, combine the duplicate common table expression queries.

In this embodiment, the duplicate CTE queries can be combined to reduce the number of the translated query sentences, so as to make the running speed for the queries much faster.

In an embodiment, the system 400 may further include: means configured to, based on the relational database, according to the translated queries, build a query tree; and means configured to, according to estimated cost for each node of the query tree, reconstruct the query tree to reduce the total estimated cost.

The query tree is a Left deep join tree, each connection father node having two child nodes in the left deep join tree indicates a connection operation between two relational data sets, each non-connection father node having only one child node and this child node indicate a selection or projection operation for one relational data set, the respective nodes of the left deep join tree are numbered in post order traversal, and the leftmost child node has the least number, The building of the query tree is a common technology in the present field, and constructing the query tree by a left deep join tree can relatively intuitively reflect the procedure for the queries.

In an embodiment, the means configured to reconstruct the query tree can be configured to rewrite the connection order of the query tree to reduce the entire estimated cost. In particular, in another embodiment, the means configured to reconstruct the query tree can be configured to carry out a process on each connection father node sequentially in the number order with the connection father node with the least number as a start, wherein the process on one connection father node includes: estimating the cost for two child trees connected with the connection father node and the cost for obtaining the connection father node by connecting the two child trees; and determining whether the left child tree and the right child tree are exchangeable by: estimating the cost for the connection father node after exchanging the left and right child trees; and if the cost after exchanging the left and right child trees is reduced, then exchanging the left and right child trees to rewrite the connection order of the connection father node.

In this embodiment, the query tree constructed by the translated CTE, UDF and/or SP query sentences can be optimized to further optimize the translated CTE, UDF and/or SP query sentences, so that the entire query cost required for executing all the queries can be least (or at least less), so as to reduce the costs such as the time spent on performing these queries on the relational database as much as possible.

Normally, in the above examples, the estimated cost for each node may be the number of each data set obtained based on the statistics on the relational database. Of course, the estimated cost is not limited to this, and it may be other types of statistic data, such as time for the queries.

In an embodiment, the operations of the execution plans supported by the relational database may include one or more of: graph traversal operation and transformation, filtering, and branching operations of the graph traversal operation; and the operations of the execution plans not supported by the relational database include one or more of: path operation, cycle operation, recursive operation, and addition, deletion and alteration operations on graphic data.

In an embodiment, the imperative graphic query may be a typical Gremlin query.

As such, with the respective embodiments, it is possible to use the imperative graphic queries supported by the graphic database on the relational database to realize the substantially same execution plans without directly breaking down the operations of the execution plans into a series of primitive operations of the relational database, and meanwhile, the running speed for the queries can be faster.

Figure 5:
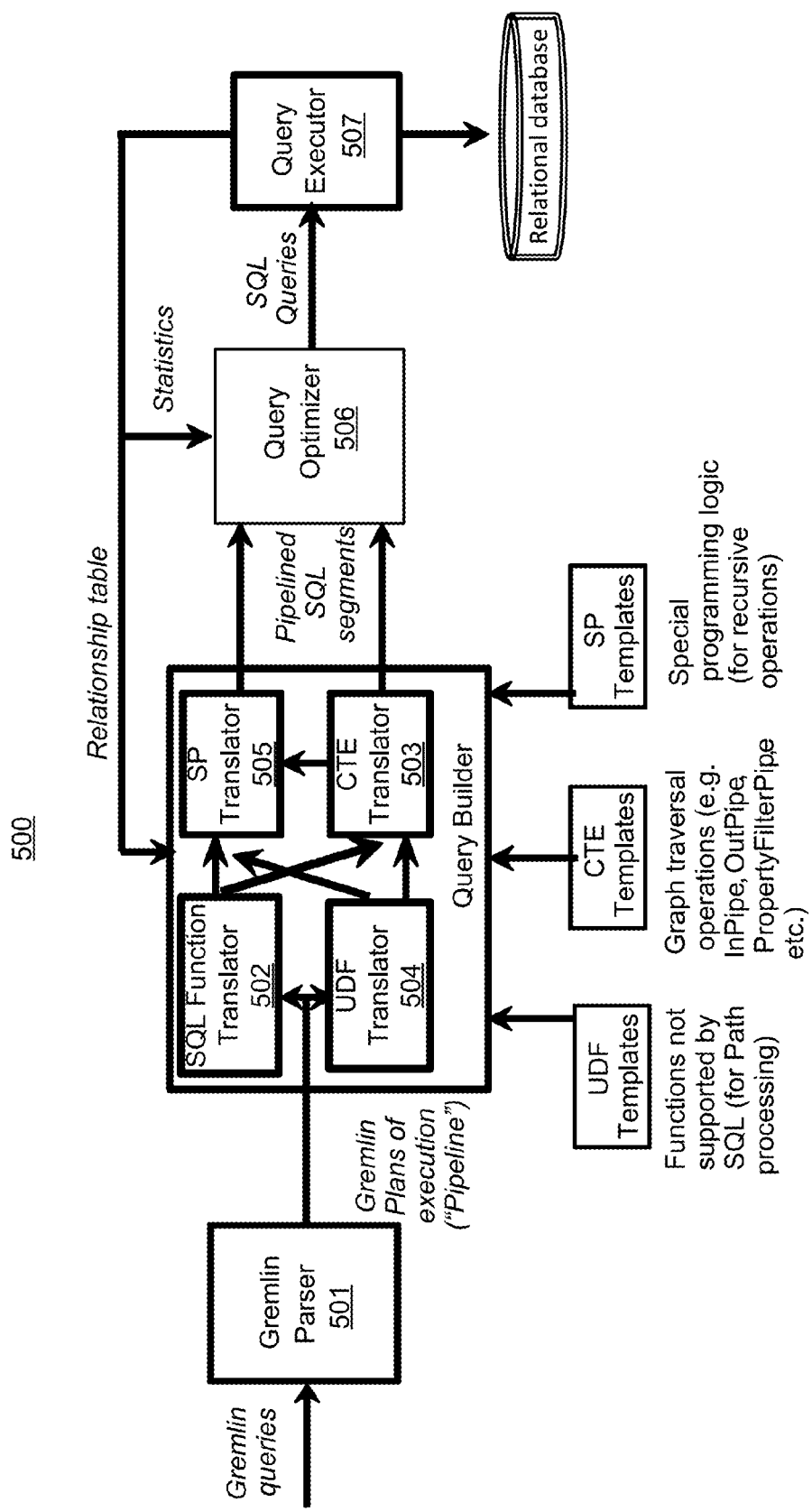
FIG. 5 shows an example block diagram of a system for supporting imperative graphic queries on a relational database according to a further yet embodiment of the present invention.

FIG. 5 shows an example block diagram of a system for supporting imperative graphic queries on a relational database according to a further yet embodiment of the present invention. FIG. 5 illustrates a preferred embodiment of a system 500 for supporting imperative graphic queries on a relational database by taking Gremlin as an example of the imperative graphic query language.

As shown in FIG. 5, the system 500 includes: a Gremlin parser 501 configured to parse input Gremlin query language as operations of execution plans; an SQL function translator 502 configured to translate the parsed operations of the execution plans into SQL functions; a CTE translator 503 configured to translate the SQL functions supported by the relational database into CTE queries according to CTE templates and the relational tables of the relational database; a UDF translator 504 configured to translate the SQL functions not supported by the relational database into UDF queries according to UDF templates and the relational tables of the relational database; an SP translator 505 configured to translate particular SQL functions into SP queries according to SP templates and the relational tables of the relational database; a query optimizer 506 configured to optimize the CTE queries, the UDF queries and/or the SP queries according to statistics data of the relational database; and a query executor 507 configured to execute the optimized CTE queries, UDF queries and/or SP queries on the relational database. The SQL function translator 502, the CTE translator 503, the UDF translator 504 and the SP translator 505 can be commonly referred to as a query builder. Herein, the SQL function translator 502 utilizes the SQL built-in function to process particular operations in the Gremlin queries, such as comparing and string joiner and so on, while the UDF is a user-defined SQL function, for translating functions which are not supported by the SQL built-in functions. Of course, the SQL function translator 502 is not necessary.

The operations of execution plans supported by the relational database which are translated as CTE may include graphical traversal operations, such as InPipe, OutPipe, PropertyFilterPipe and so on, and conversion, filtering and branch operations and so on during the graphical traversal operations, while the operations of execution plans not supported by the relational database which are translated as UDF may include for example, path process and so on, and the operations of particular execution plans which are translated as SP may include for example recursive operation, cyclic operation, operations of addition, deletion or altering graphical data and so on.

As seen from the illustrative data flow arrows as shown in FIG. 5, the respective operations of the execution plans can go through first the UDF translator 504 and the SQL function translator 502 (not in order), (if there is no execution plan needing to be translated into UDF queries, this step can be omitted), and in addition, can go through the CTE translator 503, and further can go through the SP translator 505 (if there is no execution plan needing to be translated into SP queries, this step can be omitted). The CTE translator 503 may use the results from the UDF translator 504 and the SQL function translator 502, and the SP translator 505 may use the results from the UDF translator 504, the SQL function translator 502 and the CTE translator 503. The ultimate translation results can be SQL queries or SP calls in CTE format. And the UDF/SQL functions can be already embedded into the CTE/SP during the translation. Similarly, if the ultimate translation results are only SP calls, then the CTEs may also be embedded into the SP calls.

To be noted that, the order indicated by the arrows as shown in FIG. 5 is only an example but not a limitation, and in fact, the order of going through the UDF translator 504, the SQL function translator 502, the CTE translator 503, and the SP translator 505 can be changed and any of the above translators can be omitted according to particular contents of the operations of the execution plans.

FIGS. 6A-6F show schematic diagrams of procedures of the particular steps executed by the system as shown in FIG. 5.

Figure 6A:
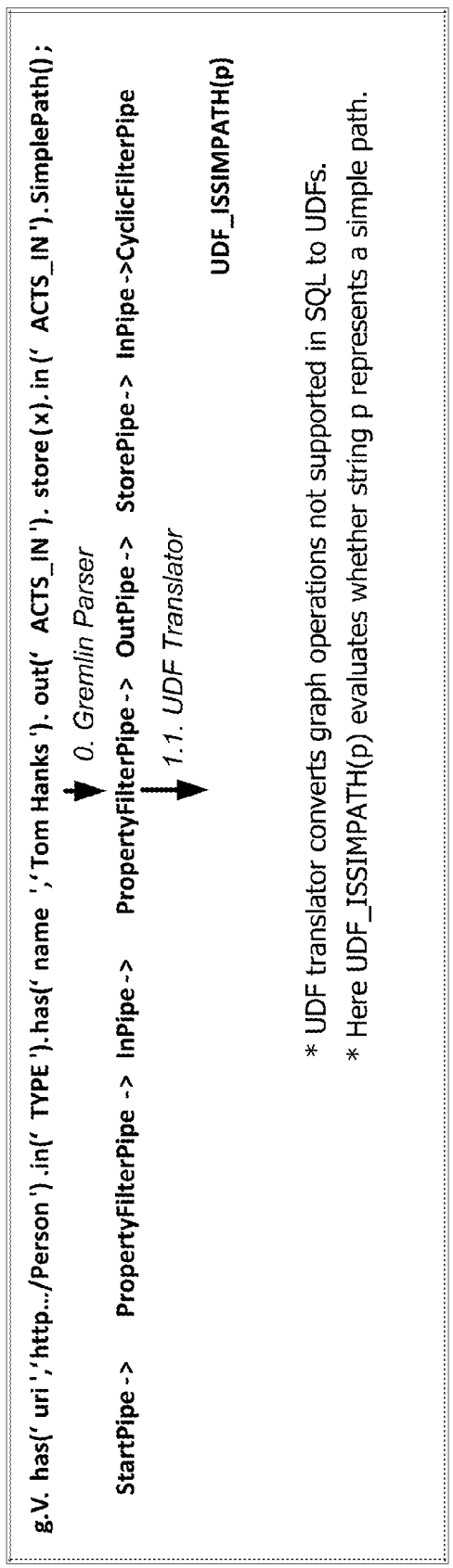
FIGS. 6A-6F show schematic diagrams of procedures of the particular steps executed by the system as shown in FIG. 5.

As shown in FIG. 6A, the highest row of the Gremlin imperative graphic query is: for example, g.V.has('uri', 'http . . . /Person').in('TYPE').has('name','Tom Hanks').out('ACTS_IN').store(x).in('ACTS_IN').SimplePath( ).

After going through the Gremlin parser 501 as shown in FIG. 5, it is parsed as the operation of the execution plan of the second row as shown in FIG. 6A, for example:

StartPipe→PropertyFilterPipe→InPipe→PropertyFilterPipe→OutPipe→StorePipe→InPipe→CyclicFilterPipe.

As shown in FIG. 6A, the operations of execution plans which are not supported by the relational database can be translated into UDF functions by the UDF translator 504. Since the UDF function allows the user to self-define functions to add new functions, thus expanding the functions of the relational database, so that the user-defined new UDF functions can support operations which were originally not supported by the relational database, such as path processing and so on, that is, the path processing which can be for example supported by the graphic database is translated into a UDF function which can be supported by the relational database.

As such, pipelines of StartPipe, PropertyFilterPipe, InPipe, PropertyFilterPipe, OutPipe, StorePipe and InPipe are not translated into UDF, only the pipeline of CyclicFilterPipe is translated into the function UDF_ISSIMPATH(p) as shown in FIG. 6A, and the function evaluates whether the character string p indicates a simple path. The path processing is only a kind of typical operation in the graphic query, while the simple path is a path which does not include reduplicate nodes. Determining whether a given path is a simple path may be a basis for many graphic algorithms. Of course, such UDF function is merely an example.

Of course, if the operations of execution plans parsed by the Gremlin parser 501 do not include operations of execution plans not supported by the relational database, i.e., only include operations of execution plans supported by the relational database, the step of UDF translating by the UDF translator 504 can be omitted.

Figure 6B:
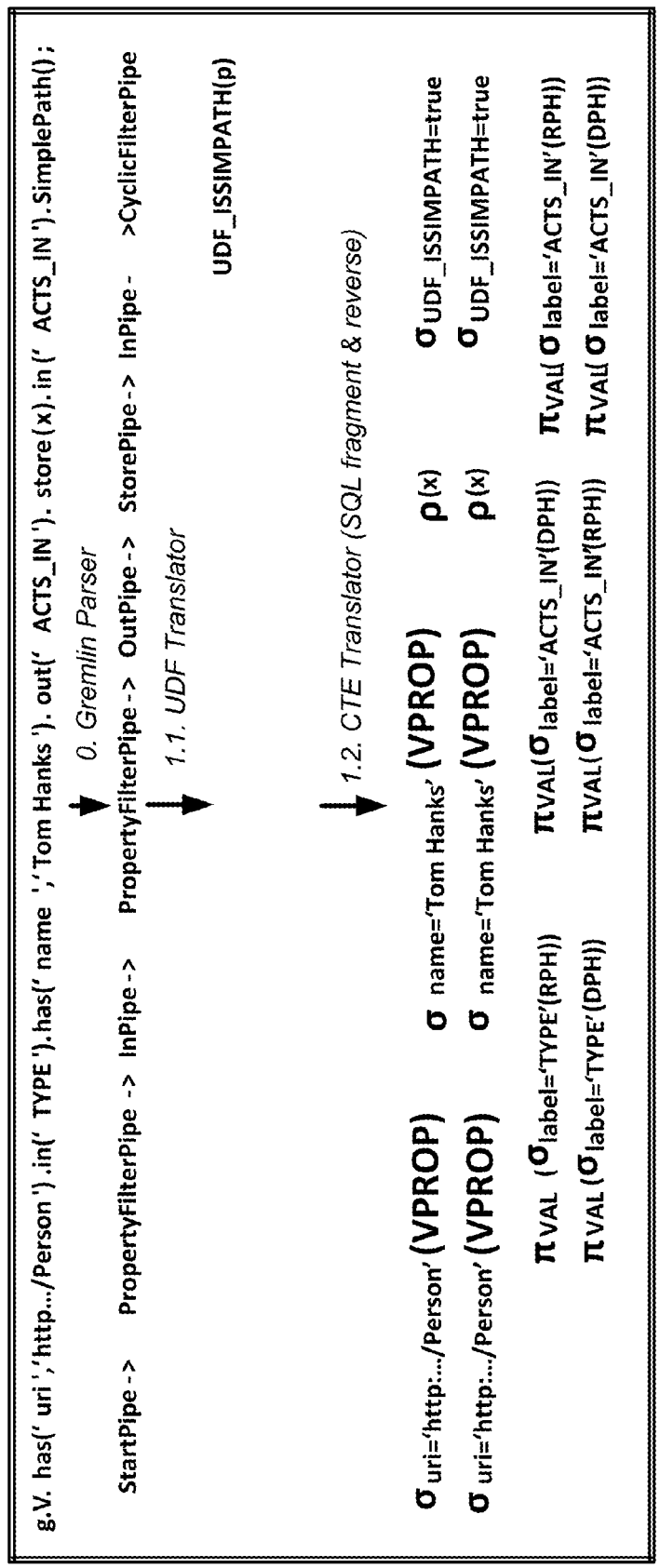

With reference to FIG. 6B, after the UDF translator 504 translates the operations of execution plans originally not supported by the relational database, the rest operations of execution plans may include operations of execution plans which can be originally supported by the relational database, such as InPipe, OutPipe, PropertyFilterPipe and so on, and transformation, filtering and branching operations and so on of the graph traversal operations. Or as above, in the case that there are only operations of execution plans which can be supported by the relational database, next, as shown in FIG. 6B, the translation of the operations of execution plans into CTEs is performed by the CTE translator 503, and its procedure is for example the CTE translator converts the graphic operations into SQL segments, and sequential SQL segments may be combined into one CTE query. For example, see the respective CTE functions as shown in FIG. 6B (represented by relational operators), $\sigma_{uri='http: . . . /Person'}$ (VPROP) (corresponding to the pipelines of StartPipe and PropertyFilterPipe), $\pi_{VAL}(\sigma_{label='TYPE'}(RPH))$ (corresponding to the pipeline of InPipe), $\sigma_{name='Tom\ Hanks'}$ (VPROP) (corresponding to the second pipeline, ProperFilterPipe), $\pi_{VAL}(\sigma_{label='ACTS\_IN'}(DPH))$ (corresponding to the pipeline of OutPipe), $\rho(x)$ (corresponding to the pipeline of StorePipe), and $\pi_{VAL}(\sigma_{label='ACTS\_IN'}(RPH))$ (corresponding to the pipeline of InPipe). $\pi$ represents a projecting operation, $\sigma$ represents a selection operation, and $\rho$ represents a renaming operation.

For reversible operations (such as InPipe and OutPipe and reciprocally reversible operations), the CTE translator may generate reversed SQL segments, and a plurality of SQL segments can be combined as one CTE query. The second row of the CTE function as shown in FIG. 6B is a CTE query function combined by illustrative reversible SQL segments, for example, the reversed operation of $\sigma_{uri='http: . . . /Person'}$ (VPROP) is still $\sigma_{uri='http: . . . /Person'}$ (VPROP), and so on, while the reversed operation of $\pi_{VAL}(\sigma_{label='TYPE'}(RPH))$ is VAL($\sigma_{label='TYPE'}(DPH)$), and so on.

In some cases, the CTE translator 503 may further translate some UDF queries translated by the UDF translator 504 into CTE queries. For example, the CTE function $\sigma_{UDF\_ISSIMPATH=true}$ as shown in FIG. 6E is obtained by further translating the translated UDF function UDF_ISSIMPATH(p) into a CTE function. As such, the running speed for the queries can be faster.

Figure 6C:
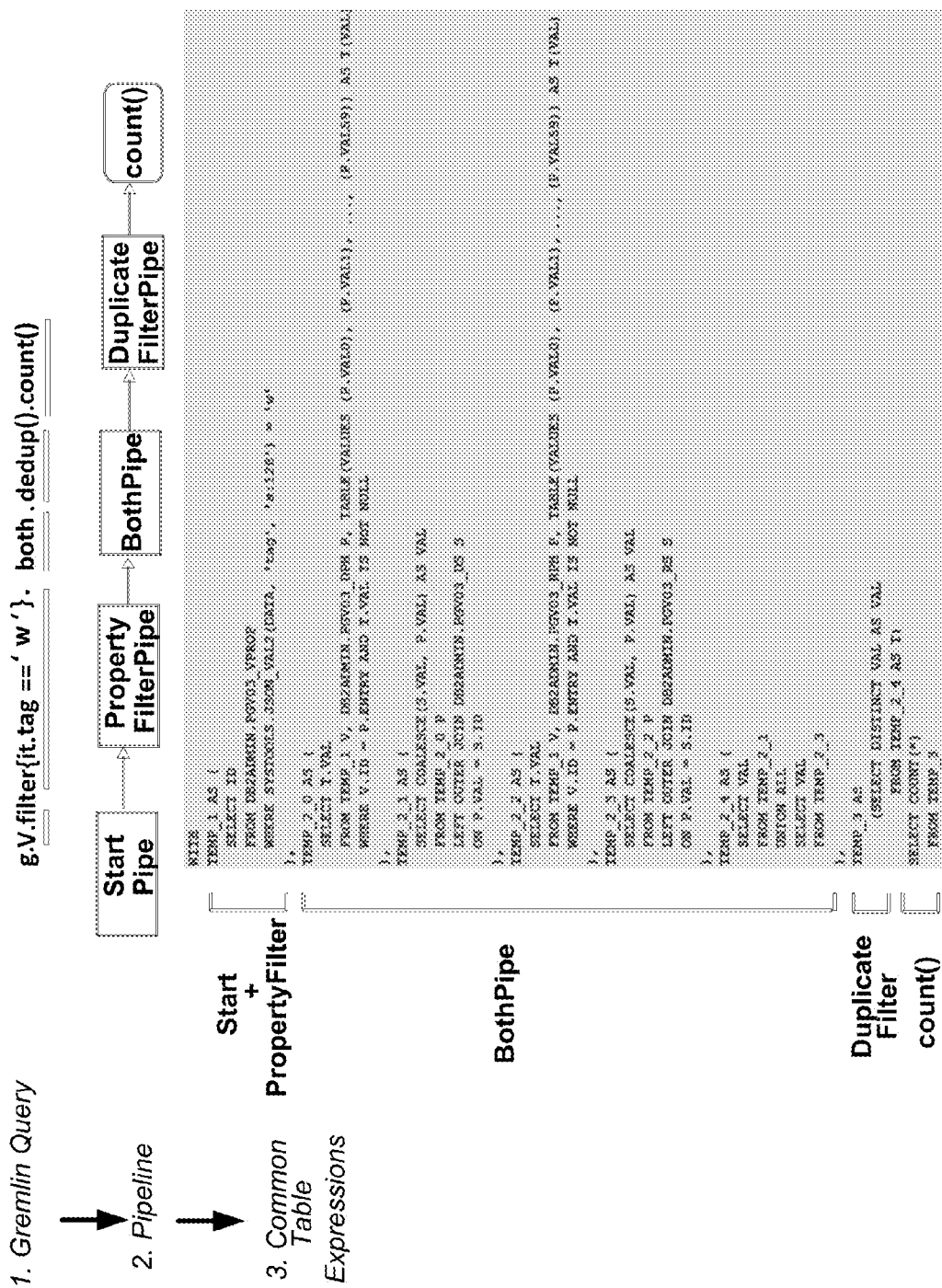

FIG. 6C shows an example for combining the SQL segments into a CTE function. For example, each part enclosed by the left large brackets is a CTE function, while the right particular functions such as TEMP_1, TEMP_2_0 and so on are the respectively SQL segments. As such, the SQL segments are combined as the CTE function, which can further fasten the running speed compared to separately running each SQL segment.

In addition, in some cases, the SP translator 505 can also further translate some UDF queries translated by the UDF translator 504 and/or some CTE queries translated by the CTE translator 503 into SP queries. As such, the running speed for the queries can be faster.

Herein, in order to further reduce the number of the translated CTE queries and save time and cost for the CTE queries, the CTE translator 503 can also, in response to duplicate common table expression queries existing in the translated common table expression queries, combine the duplicate common table expression queries into a CTE query.

Figure 6D:
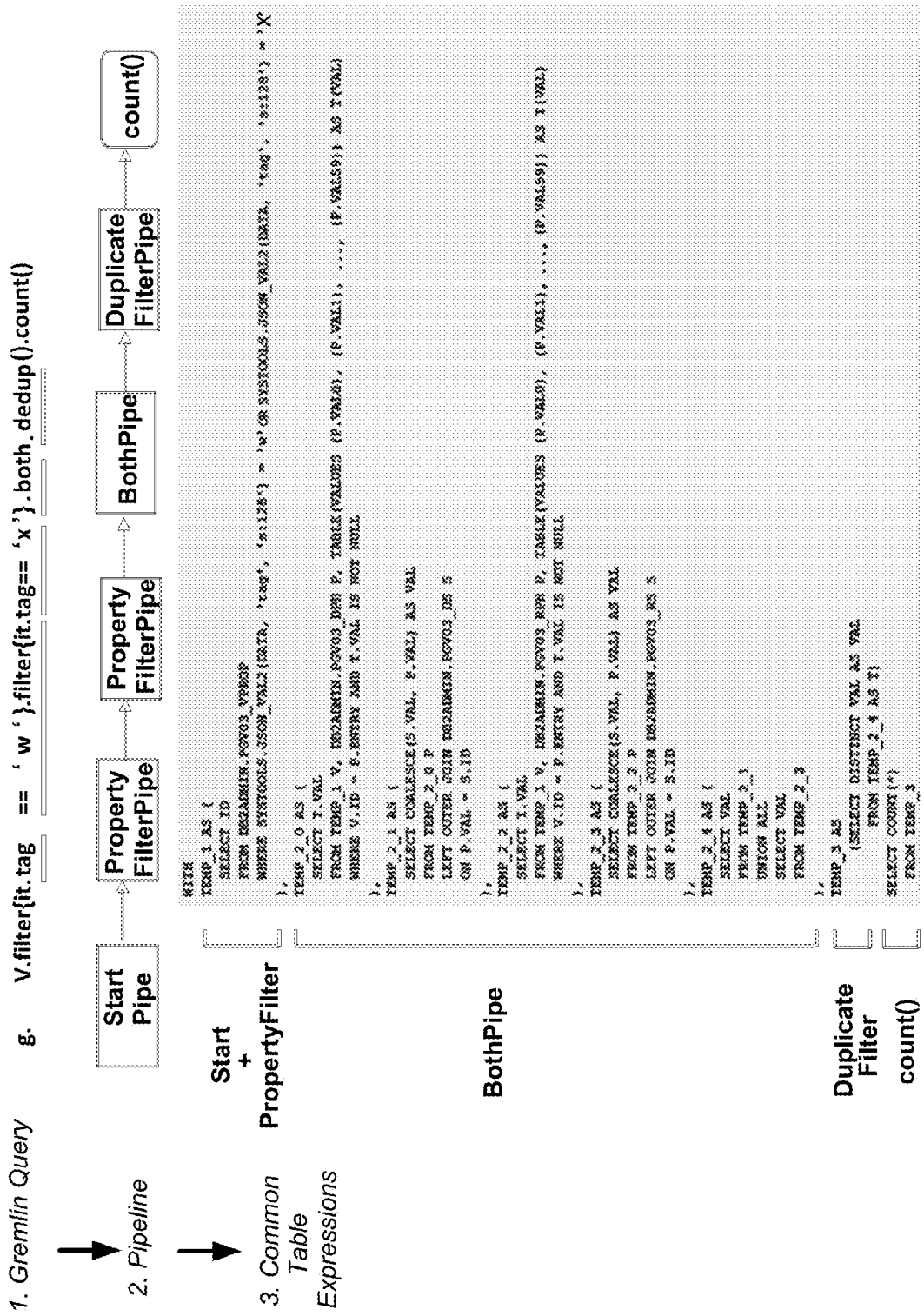
Figure 6E:
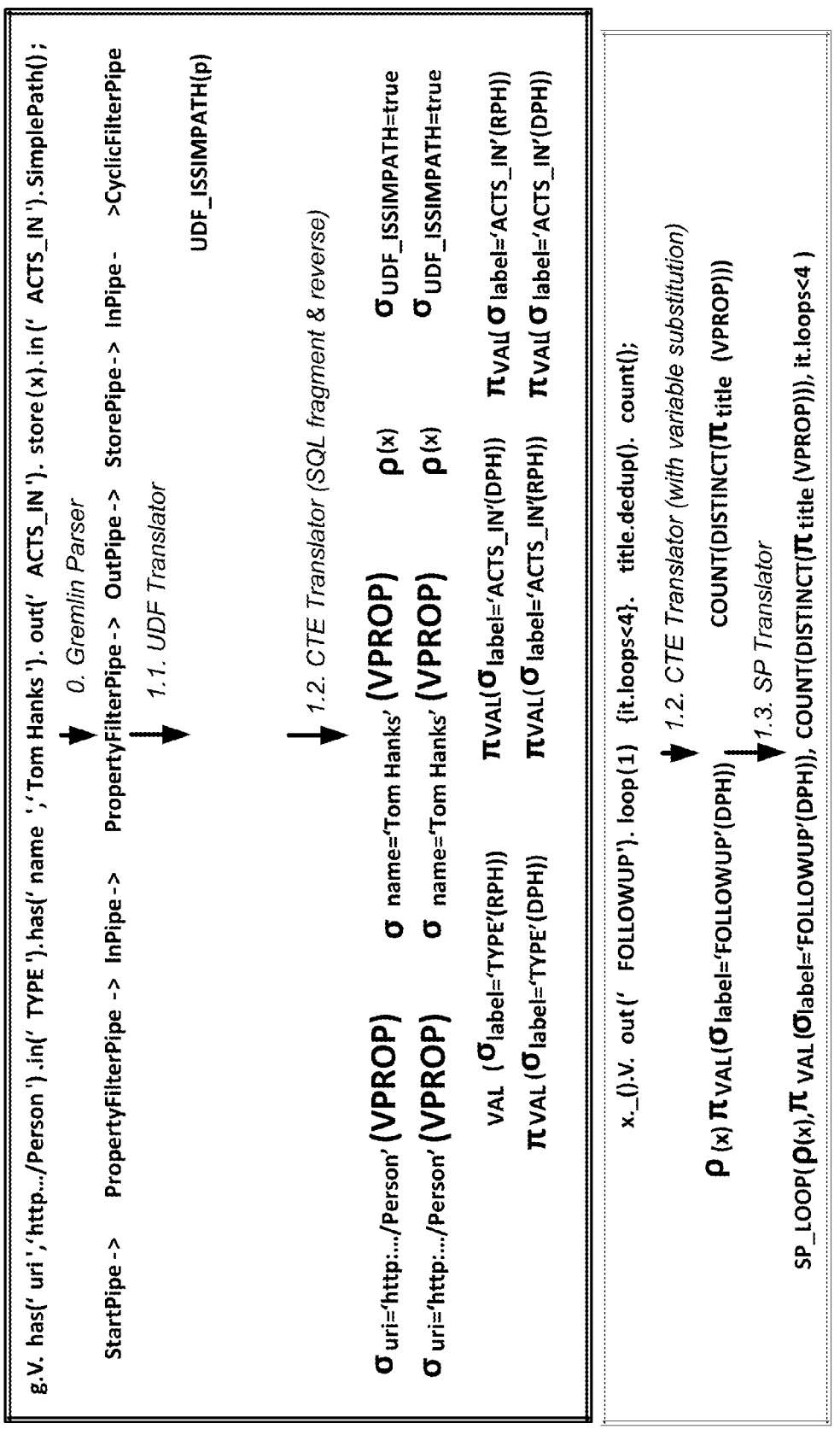

For example, as shown in FIG. 6D, it can be seen that there are two operations of execution plans (or pipelines) similar or same (herein, it is possible that the function names or some variables of the operations of execution plans may be different, but the general tables for the queries and the elements for the queries are substantively same, so they can also be considered similar or same), for example, there are filter(it.tag=='w') and filter(it.tag=='x') in the Gremlin query, that is, there are two attribute filter pipes when being parsed as pipelines of execution plans, one of which is to filter out items with an attribute of w from the table, the other of which is to filter out items with an attribute of x from the table. The CTE translator 503 can combine the two replicate CTE queries into one CTE query. As shown in FIG. 6D, in the first CTE function of initial+attribute filter, they are combined as WHERE SYSTOOLSJSON_VAL2(DATA, 'tag','s:128'='w' OR SYSTOOLS.JSON_VAL2(DATA, 'tagVs:128'='x'), i.e., the same table is simultaneously queried to filter out items with the attributes of w and x. As such, the waste of time and cost due to the execution of the replicate CTEs (for example, the same table is queried twice, to filter out items with an attribute of w from the table and filter out items with an attribute of x from the table, respectively) can be reduced, so as to further speed up the execution speed and efficiency.

Of course, if there is not operation of execution plans which can be supported by the relational database in the operations of execution plans, the translation from the operations of execution plans to the CTE performed by the CTE translator 503 may be also omitted.

As shown in the lower block of FIG. 6E, the SP translator 505 can translate special SQL functions in the operations of execution plans (for example, the cyclic query in the lower block of FIG. 6E, x._( ).V.out('FOLLOWUP').loop(1) {it.loops<4}.title.dedup( ).court( )) into an SP call, meanwhile the translated SQL segments are used as the parameters of the SP. Of course, its procedure can include firstly translate the cyclic query into the CTE function, as shown in the lower block of FIG. 6E, but the CTE function is run with a relatively low efficiency, so the CTE function can be further translated into the SP function. The SP is performed by designating the name of the SP and giving parameters (if the SP has parameters), thereby performing the special SQL function of such cyclic query on the relational database to improve the running efficiency.

Figure 6F:
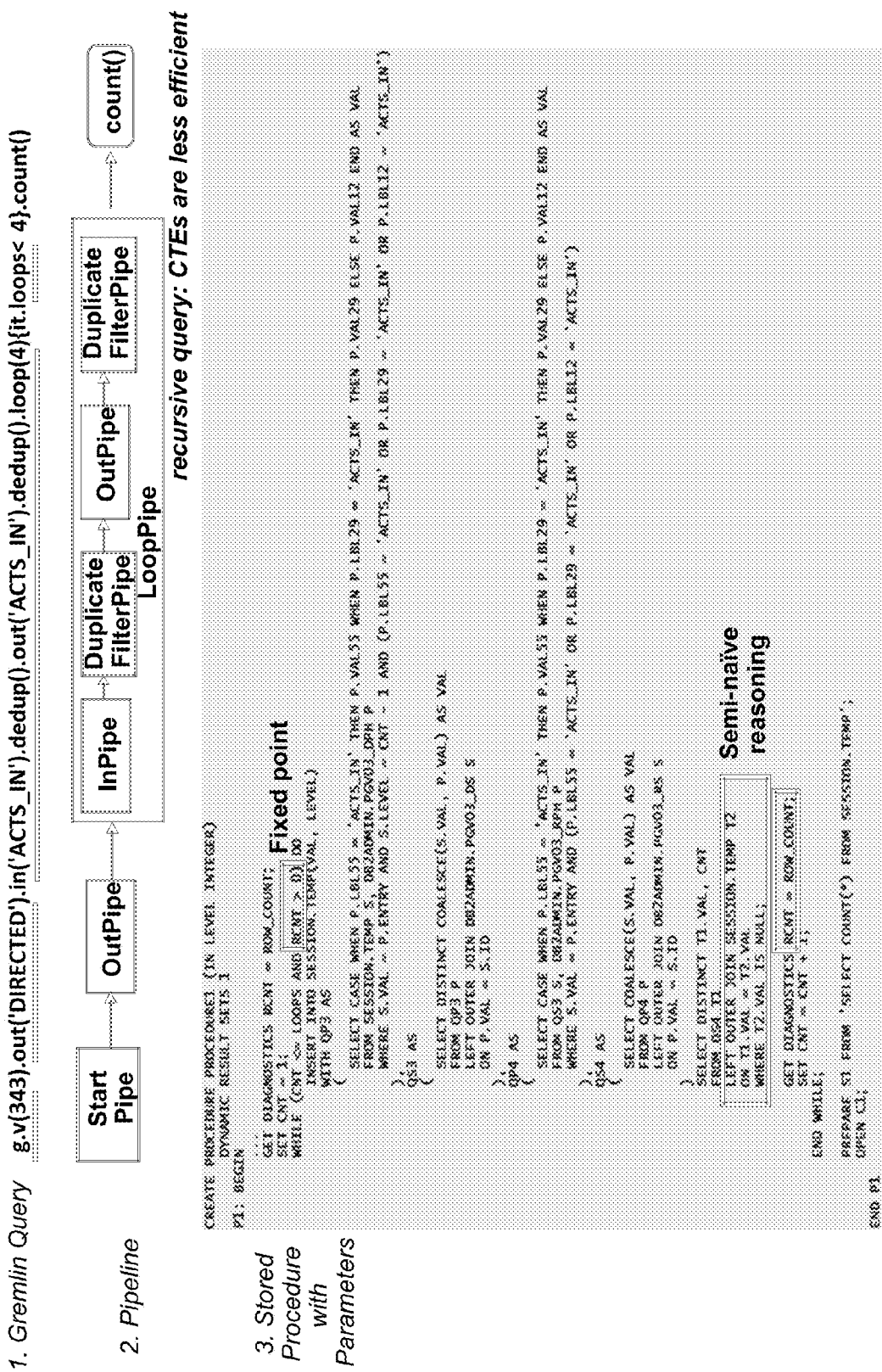

Of course, in addition to cyclic queries, the SP translator 503 can also translate recursive operations, operations of addition, deletion or altering graphical data and so on into SPs. FIG. 6F shows an SP translation procedure for a recursive CTE query, herein since it is inefficient to first translate into the recursive CTE query by using the CTE and then execute the CTE, however, it is more efficient to further translate the recursive CTE query by using the SP, thereby further improve the speed of the query execution.

Thus, by translating some operations of execution plans into SPs by the SP translator 505, not only such special operations of execution plans can be executed on the relational database, and also the running speed can be further faster due to the SP's feature itself.

As such, by translating the imperative query originally supported by the graphic database into query languages executable by the relational database by the CTE translator 503, the UDF translator 504 and/or the SP translator 505 (one or more of which are determined to be used according to particular content of the operations of execution plans), the imperative graphic language can be well executed on the relational database.

In order to further optimize the query language executable by the relational database, to speed up the speed for the query, it is described below what optimization action is performed on the query language translated by the above CTE translator 503, the UDF translator 504 and/or the SP translator 505, by examples.

Figure 7:
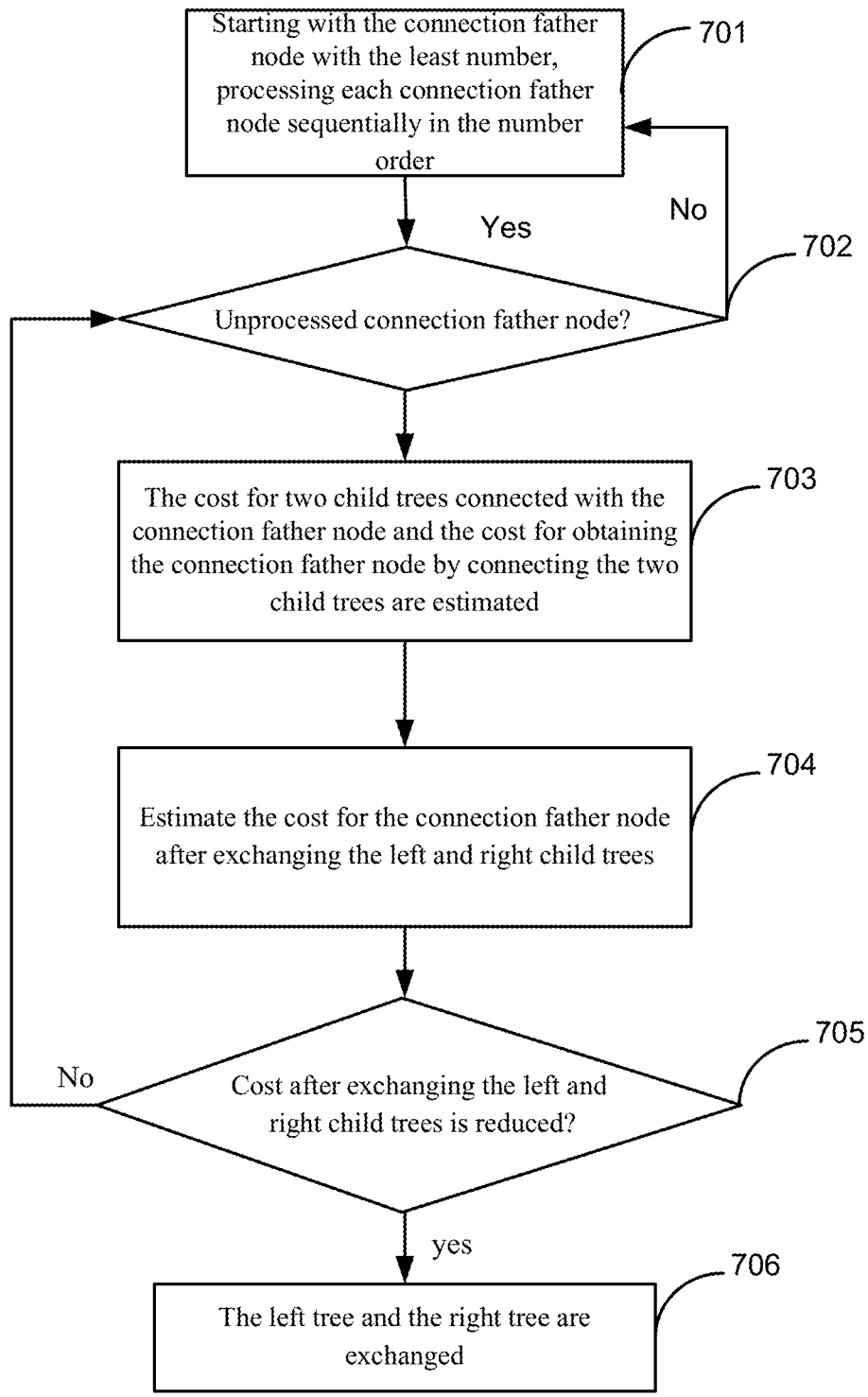
FIG. 7 shows a flowchart of steps for the optimizing performed by the query optimizer of the system as shown in FIG. 5.

FIG. 7 shows a flowchart of steps for the optimizing performed by the query optimizer 506 of the system 500 as shown in FIG. 5.

First, the query optimizer 506 of the system 500 as shown in FIG. 5 can, based on the relational table contents of the relational database, according to the translated CTE queries, UDF queries and/or SP queries and possibly some primitive SQL functions not translated and directly broken down, build a query tree.

The query tree is a Left deep join tree, each connection father node having two child nodes in the left deep join tree indicates a connection operation between two relational data sets, each non-connection father node having only one child node and this child node indicate a selection or projection operation for one relational data set, the respective nodes of the left deep join tree are numbered in post order traversal, and the leftmost child node has the least number. The building of the query tree is a common technology in the present field, and constructing the query tree by a left deep join tree can relatively intuitively reflect the procedure for the queries.

The query optimizer 506 can perform the optimizing steps as shown in FIG. 7, including: step 701, starting with the connection father node with the least number, processing each connection father node sequentially in the number order; step 702, determining whether the current father node is an unprocessed connection father node? If so, proceeding with step 703, at which the cost for two child trees connected with the connection father node and the cost for obtaining the connection father node by connecting the two child trees are estimated; and if not so, returning to step 701; step 704, estimating the cost for the connection father node after exchanging the left and right child trees; step 705, determining whether the cost after exchanging the left and right child trees is reduced. If so, proceeding with step 706, at which the left tree and the right tree are exchanged to rewrite the connection order of the connection father node; if no, returning to step 702 to process the next connection father node.

As such, the total query cost required for executing all the queries can be reduced to the least (or at least less), so as to decrease the cost of the time and so on spent on performing these queries on the relational database as much as possible.

Figure 8A:
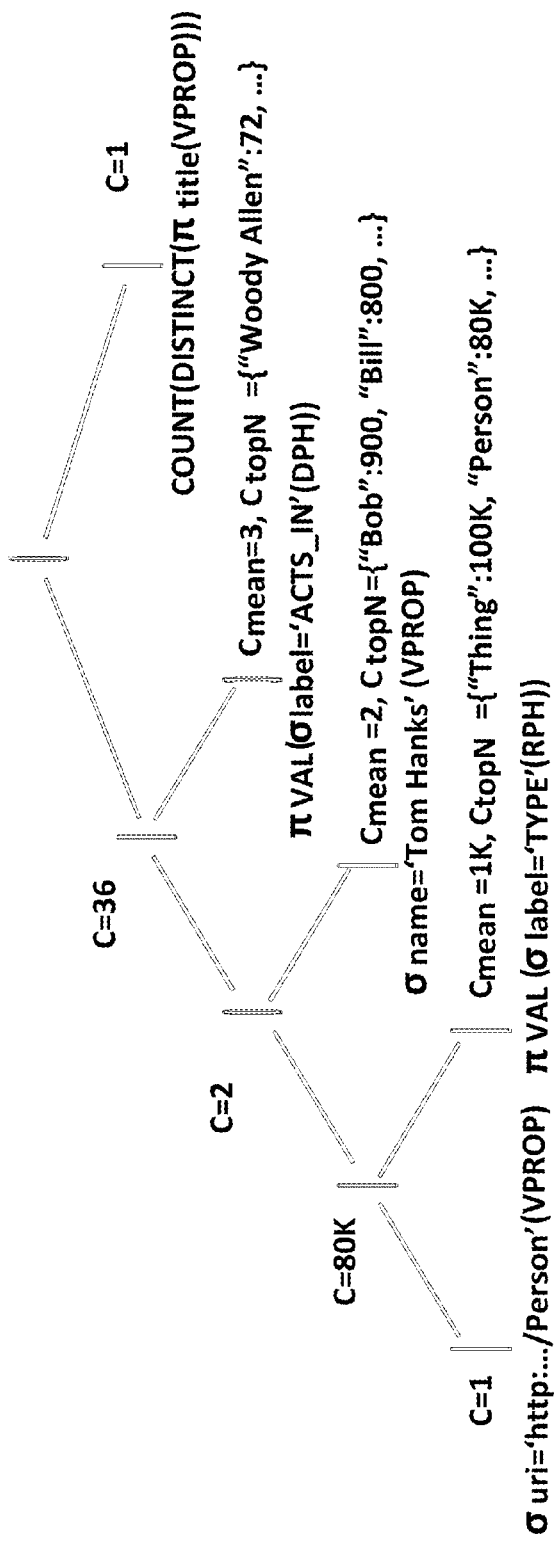
FIGS. 8A-8C show a schematic diagram of the procedure of optimizing performed by the query optimizer of the system as shown in FIG. 5.
Figure 8B:
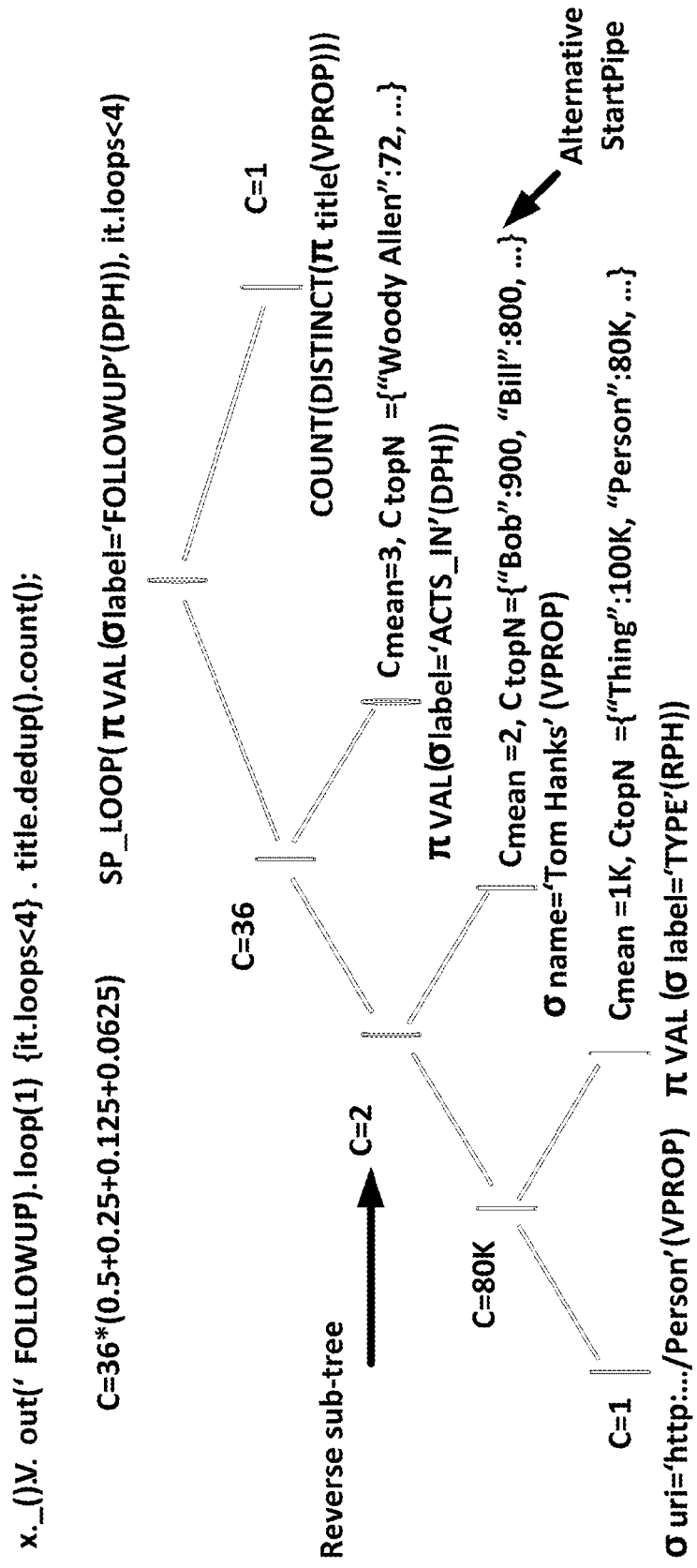
Figure 8C:
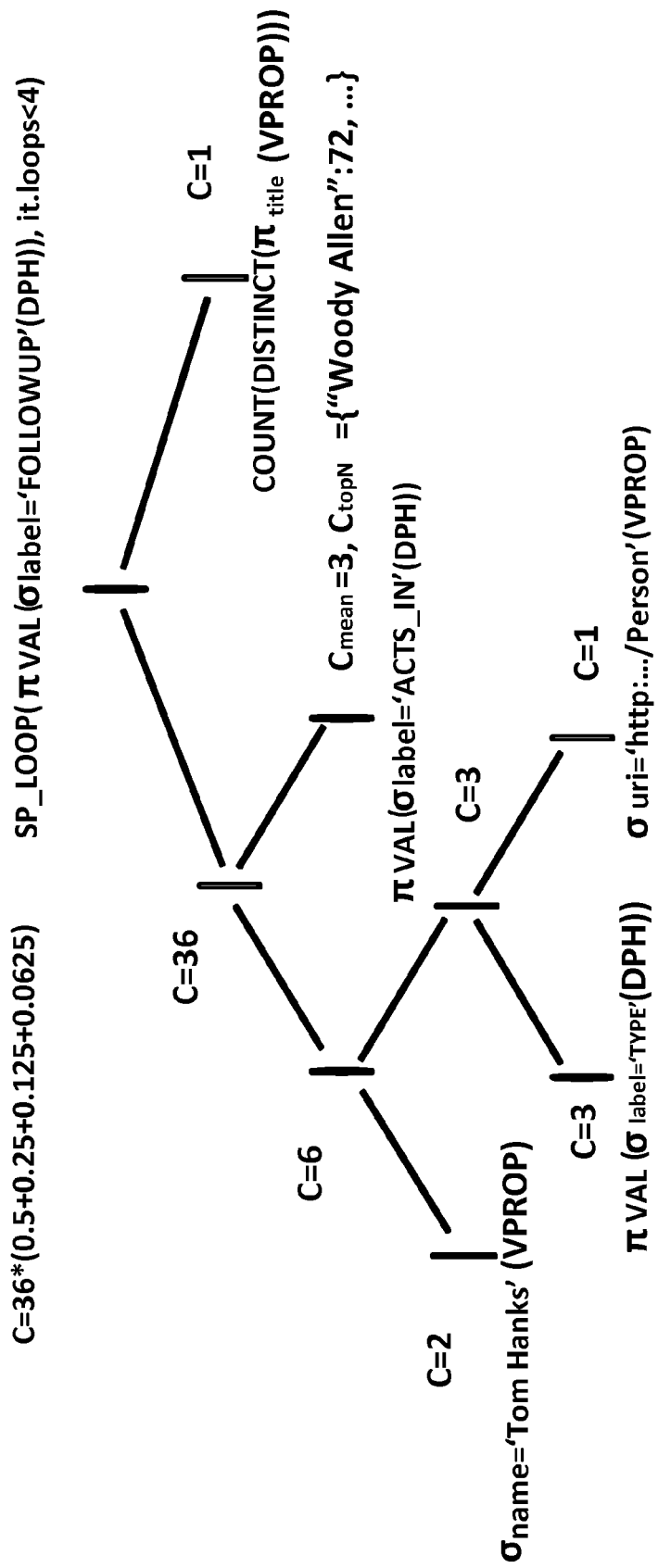

The particular examples of the respective steps as shown in FIG. 7 are explained below with reference to FIGS. 8A-8C. FIGS. 8A-8C show a schematic diagram of the procedure of optimizing performed by the query optimizer of the system as shown in FIG. 5.

FIG. 8A shows a left deep query tree built based on the relational table contents of the relational database, according to the translated CTE queries, UDF queries and/or SP queries. The nodes of the left deep join tree are numbered in post order traversal, and the leftmost child node has the least number. Each connection father node having two child nodes in the left deep join tree indicates a connection operation between two relational data sets, each non-connection father node having only one child node and this child node indicate a selection or projection operation for one relational data set. The estimated cost C of each node is for example the number of the datasets of the node obtained based on the statistics character of the relational database (for example, according to both of the graphic data character and the relational storage character), that is, $C(Op)=|Intermediate\_Result\_Set(Op)|$ as shown in FIG. 8A, and $C(Q)=\Sigma C_{mean}(Op)$. As shown in FIG. 8A, the estimated cost C of the leftmost node=1, and then, C=1K (wherein K≈1000), C=80K, C=2, C=2, C=36, C=3 and so on.

As shown in FIG. 8B, if the child trees are exchanged, for example, after the left and right child trees of the connection father node pointed by the rightward arrow as shown in FIG. 8B, the costs of the respective nodes are obtained as shown in FIG. 8C, for example, the estimated costs from the bottom left are C=3, C=1, C=3, C=2, C=6, and compared to the original cost as shown in FIG. 8A, for example, C=1K, C=80K, C=2, C=2, the cost, i.e., the data amount of the datasets is greatly reduced, i.e., the number of the items of the query table is reduced, thereby decreasing the cost of the time and so on spent on performing these queries on the relational database.

And then the left and right child trees of the other connection father nodes are exchanged, and the cost after the exchanging is estimated to compare to the cost prior to the exchanging, and if such cost can be reduced, the left and right child trees are exchanged, so as to finally obtain the query tree structure with the lowest total cost (or at least the less total cost than the original).

The query executor 507 reconstructs the SQL query sentences on the relational database according to the finally obtained query tree structure with the lowest total cost, thereby executing the reconstructed SQL query sentences on the relational database, so that while the Gremlin query sentences which can only be originally supported by the graphic database can be executed on the relational database, the number of the inquired tables and the number of the items for executing the query sentences can be further reduced and the cost of the time and so on for the queries can be further saved.

Of course, the query tree optimizing step performed by the query optimizer 506 is optional, for further saving the cost of the time and so on for the queries, and is not necessary.

As such, according to the respective embodiments of the present invention, not only the Gremlin query sentences which can only be originally supported by the graphic database are executed on the relational database, but also the cost of the time and so on for the queries can be saved properly to different extents.

Of course, the above particular embodiments are only examples but not limitations, and the person skilled in the art can combine some steps and means in the respectively described embodiments, according to the concept of the present invention, to realize the effect of the present invention, and such embodiments obtained by such combinations are also included in the present invention, and such combinations will not be described one by one.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer readable program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer program readable instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for supporting imperative graphic queries on a relational database, comprising:
   parsing an imperative graphic query into operations of execution plans;
   translating operations of execution plans which are supported by the relational database into common table expression queries;
   executing the translated common table expression queries on the relational database;
   building a query tree based on the relational database according to translated queries; and
   reconstructing the query tree to reduce a total estimated cost according to estimated cost for each node of the query tree,
   wherein the query tree is a Left deep join tree,
     each connection father node having two child nodes in the left deep join tree indicates a connection operation between two relational data sets,
     each non-connection father node having only one child node and this child node indicate a selection or projection operation for one relational data set, respective nodes of the left deep join tree are numbered in post order traversal, and a leftmost child node has a least number, and
   wherein the step of reconstructing the query tree to reduce the total estimated cost according to estimated cost for each node of the query tree includes:
     a process on each connection father node sequentially in a number order with the connection father node with the least number as a start, wherein the process on one connection father node includes:
       estimating the cost for two child trees connected with the connection father node and the cost for obtaining the connection father node by connecting the two child trees; and
       determining whether a left child tree and a right child tree are exchangeable by: estimating the cost for the connection father node after exchanging the left and right child trees; and if the cost after exchanging the left and right child trees is reduced, then exchanging the left and right child trees to rewrite a connection order of the connection father node.

2. The method according to claim 1, further comprising:
   translating operations of execution plans which are not supported by the relational database into user-defined function queries; and executing translated user-defined function queries on the relational database.

3. The method according to claim 2, further comprising:
translating particular queries among the translated user-defined function queries into common table expression queries.

4. The method according to claim 2, further comprising:
translating particular queries among the translated user-defined function queries into stored procedure queries.

5. The method according to claim 1, further comprising:
translating operations of execution plans which are not supported by the relational database into stored procedure queries; and
executing translated stored procedure queries on the relational database.

6. The method according to claim 5, further comprising:
translating particular queries among the translated common table expression queries into stored procedure queries.

7. The method according to claim 1, further comprising:
in response to duplicate common table expression queries existing in the translated common table expression queries, combining the duplicate common table expression queries.

8. The method according to claim 1, wherein the estimated cost for each node is a number of each data set obtained based on statistics on the relational database.

9. The method according to claim 1, wherein the operations of the execution plans supported by the relational database include one or more of: graph traversal operation and transformation, filtering, and branching operations of the graph traversal operation; and the operations of the execution plans not supported by the relational database include one or more of: path operation, cycle operation, recursive operation, and addition, deletion and alteration operations on graphic data.

10. A system for supporting imperative graphic queries on a relational database, comprising:
means configured to parse an imperative graphic query into operations of execution plans;
means configured to translate operations of execution plans which are supported by the relational database into common table expression queries;
means configured to execute the translated common table expression queries on the relational database;
means configured to build a query tree based on the relational database according to translated queries; and
means configured to reconstruct the query tree to reduce a total estimated cost according to estimated cost for each node of the query tree, wherein the query tree is a Left deep join tree, each connection father node having two child nodes in the left deep join tree indicates a connection operation between two relational data sets, each non-connection father node having only one child node and this child node indicates a selection or projection operation for one relational data set, respective nodes of the left deep join tree are numbered in post order traversal, and a leftmost child node has a least number,
wherein the means configured to reconstruct the query tree to reduce the total estimated cost according to estimated cost for each node of the query tree is configured to:
carry out a process on each connection father node sequentially in a number order with the connection father node with the least number as a start, wherein the process on one connection father node includes:
estimating the cost for two child trees connected with the connection father node and the cost for obtaining the connection father node by connecting the two child trees; and
determining whether a left child tree and a right child tree are exchangeable by: estimating the cost for the connection father node after exchanging the left and right child trees; and if the cost after exchanging the left and right child trees is reduced, then exchanging the left and right child trees to rewrite a connection order of the connection father node.

11. The system according to claim 10, further comprising:
means configured to translate operations of execution plans which are not supported by the relational database into user-defined function queries; and
means configured to execute translated user-defined function queries on the relational database.

12. The system according to claim 11, further comprising:
means configured to further translate particular queries among the translated user-defined function queries into common table expression queries.

13. The system according to claim 11, further comprising:
means configured to further translate particular queries among the translated user-defined function queries into stored procedure queries.

14. The system according to claim 10, further comprising:
means configured to translate operations of execution plans which are not supported by the relational database into stored procedure queries; and
means configured to execute translated stored procedure queries on the relational database.

15. The system according to claim 14, further comprising:
means configured to further translate particular queries among the translated common table expression queries into stored procedure queries.

16. The system according to claim 10, further comprising:
means configured to in response to duplicate common table expression queries existing in the translated common table expression queries, combine the duplicate common table expression queries.

* * * * *